United States Patent [19]
Tatoh

[11] Patent Number: 5,222,175
[45] Date of Patent: Jun. 22, 1993

[54] OPTICAL INTEGRATED LIGHT RECEIVING APPARATUS

[75] Inventor: Nokuyoshi Tatoh, Yokohama, Japan

[73] Assignee: Sumitomo Electric Industries, Ltd., Osaka, Japan

[21] Appl. No.: 911,024

[22] Filed: Jul. 9, 1992

[30] Foreign Application Priority Data

| Jul. 9, 1991 | [JP] | Japan | 3-168443 |
| Jul. 9, 1991 | [JP] | Japan | 3-168445 |
| Jul. 9, 1991 | [JP] | Japan | 3-168446 |

[51] Int. Cl.⁵ .......................... G02B 6/12; G02F 1/00; H01J 5/16
[52] U.S. Cl. ........................ 385/93; 385/14; 385/33; 385/49; 385/88; 385/89; 359/193; 359/195; 250/227.11
[58] Field of Search ........................ 385/14, 24, 31, 33, 385/39, 40, 49, 88, 89, 92, 93, 94; 359/189, 193, 195; 250/227.11; 357/17, 19, 20, 29, 40, 55, 72, 74, 75, 80, 30

[56] References Cited

U.S. PATENT DOCUMENTS

| 4,092,061 | 5/1978 | Stigliani, Jr. | 385/33 X |
| 4,730,198 | 3/1988 | Brown et al. | 385/89 X |
| 4,772,787 | 9/1988 | Trommer | 385/14 X |
| 4,787,696 | 11/1988 | Norris et al. | 385/92 X |
| 4,802,727 | 2/1989 | Stanley | 385/92 X |
| 4,826,272 | 5/1989 | Pimpinella et al. | 385/92 X |
| 4,871,224 | 10/1989 | Karstensen et al. | 385/51 X |
| 4,969,712 | 11/1990 | Westwood et al. | 385/14 X |
| 4,995,695 | 2/1991 | Pimpinella et al. | 385/92 X |
| 5,073,003 | 12/1991 | Clark | 385/33 |
| 5,125,054 | 6/1992 | Ackley et al. | 385/49 |
| 5,170,448 | 12/1992 | Ackley et al. | 385/14 X |

FOREIGN PATENT DOCUMENTS

| 0061772 | 10/1982 | European Pat. Off. | 385/88 X |
| 0331332 | 9/1989 | European Pat. Off. | 385/49 X |
| 0413489 | 2/1991 | European Pat. Off. | 385/93 X |
| 3508627 | 9/1986 | Fed. Rep. of Germany | 385/88 X |
| 2173917 | 10/1986 | United Kingdom | 385/88 X |

*Primary Examiner*—Brian Healy
*Attorney, Agent, or Firm*—Cushman, Darby & Cushman

[57] ABSTRACT

The light-receiving apparatus according to this invention comprises first and second package bodies. The first package body positions an optical fiber and integrally holds the optical fiber while the exit end face of the optical fiber is exposed to on outside. The second package body includes a first substrate having a lower surface on which a light-receiving portion for receiving transmission light from the optical fiber and outputting an electrical signal and first electrodes, connected to the light-receiving portions, for extracting the electrical signal are formed, and a second substrate, having second electrodes connected to the first electrodes and third electrodes connected to external leads, the second electrodes being formed on an inclined surface of a V-shaped groove of the second substrate, and the third electrodes being formed in the second substrate, and the second package body integrally holds the first and second substrates while the first substrate is held in the V-shaped groove of the second substrate and the first and second electrodes are connected to each other.

18 Claims, 15 Drawing Sheets

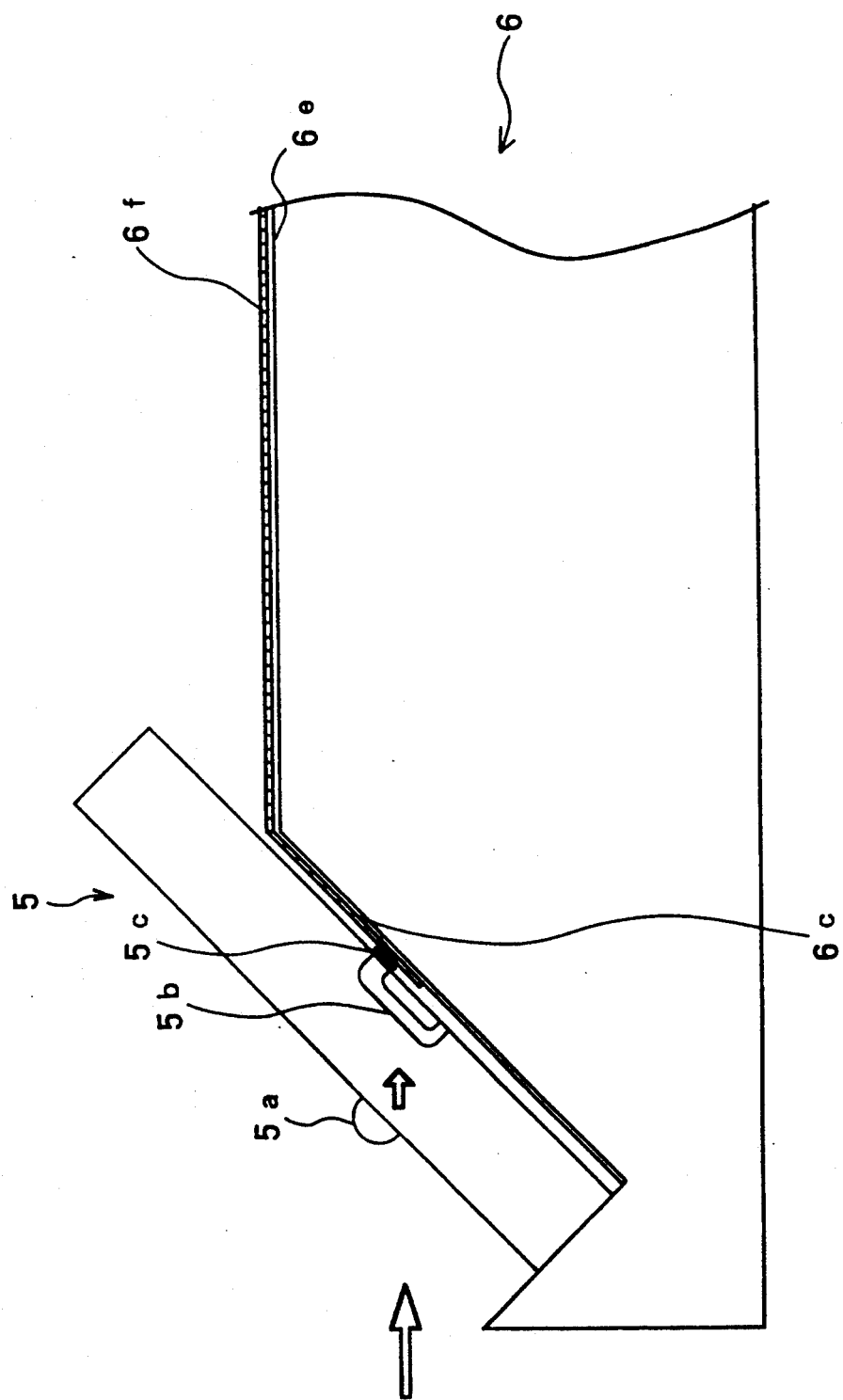

OPTICAL INTEGRATED LIGHT RECEIVING APPARATUS

BACKGROUND OF THE INVENTION

1. Field of the Invention

The present invention relates to a light-receiving apparatus constituted by a pair of package bodies positioned by mating.

2. Related Background Art

As conventional light-receiving apparatuses, structures indicated in an article entitled "High Uniformity, Low Cost Packaging of Multi-Channel InGaAs Photodetector Arrays for Parallel-Bus Optical Interconnects" (LEOS '90 Conference Digest, p. 168) and in EP-O-138630B1 are known.

The apparatus discussed in the article comprises a substrate integrally held by a resin member, an optical fiber, and a light-receiving element array. An inclined surface is formed on the substrate, and the exit surface of the optical fiber and the light-receiving surfaces of the light-receiving elements are arranged symmetrical to each other about an axis perpendicular to the inclined surface. Since a reflecting film is formed on the inclined surface, light from the optical fiber is reflected by the inclined surface of the substrate and incident on the light-receiving surfaces of the light-receiving elements.

The light-receiving apparatus shown in EP-O-138630B1 comprises a two-sided mounting L-shaped package body in which light-receiving elements are mounted on its vertical surface and an optical fiber is fixed on its horizontal surface.

In the apparatus shown in the article, the structure before packaging is unstable, and housing processing is not easy. In this apparatus, since the optical fiber and the light-receiving element array are integrally formed by a resin, the optical fiber cannot be connected to a connector.

In the light-receiving appartus shown in EP-O-138630B1, alignment of components is difficult.

In these light-receiving apparatuses, a Pin type photodiode is used as a light-receiving element. The light-receiving diameter need be set large in order to obtain high positional precision.

Furthermore, when a Pin type photodiode having a large light-receiving diameter is used, the volume is increased, which is not appropriate in a high-speed light-receiving apparatus.

SUMMARY OF THE INVENTION

An object of the present invention is to provide a light-receiving apparatus in which an optical fiber and a light-receiving portion are constituted separately so that the optical fiber and the light-receiving portion, e.g., a light-receiving element array can be separated from each other, and alignment of these components can be easily performed.

Another object of the present invention is to provide a light-receiving apparatus which has a smaller number of independent components and in which alignment of the components is easy.

A further object of the present invention is to provide a light-receiving apparatus having a small volume and capable of operating at a high speed.

In order to achieve the objects, the light-receiving apparatus according to the present invention comprises first and second package bodies. The first package body positions an optical fiber and integrally holds the optical fiber while the exit and face of the optical fiber is exposed to an outside. The second package body includes a first substrate having a lower surface on which a light-receiving portion for receiving transmission light from the optical fiber and outputting an electrical signal and first electrodes connected to the light-receiving portions for extracting the electrical signal are formed, and a second substrate, having second electrodes connected to the first electrodes and third electrodes connected to external leads, the second electrodes being formed on an inclined surface of a V groove of the second substrate, and the third electrodes being formed on the second substrate, and the second package body integrally holds the first and second substrates while the first substrate is held in the V groove of the second substrate and the first and second electrodes are connected to each other.

In the present invention, the light-receiving portion may have comb-shaped electrodes, which are connected to the first electrodes.

According to the present invention, the first package body for holding the optical fiber and the second package body for holding the light-receiving portion are separate bodies. The optical fiber held by the first package body and the light-receiving portion held by the second package body are optically coupled by mating of the first package body and the second package body.

Further, the light-receiving apparatus according to the present invention may have a third substrate for clamping the end portions of the external leads on the third electrodes of the second substrate.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

BRIEF DESCRIPTION OF THE DRAWINGS

FIG. 3 is an enlarged longitudinal sectional view of the light-receiving apparatus according to the first embodiment of the present invention in a state before packaging wherein the first substrate is held on the inclined surface of the second substrate;

DESCRIPTION OF THE PREFERRED EMBODIMENT

Figure 1A:
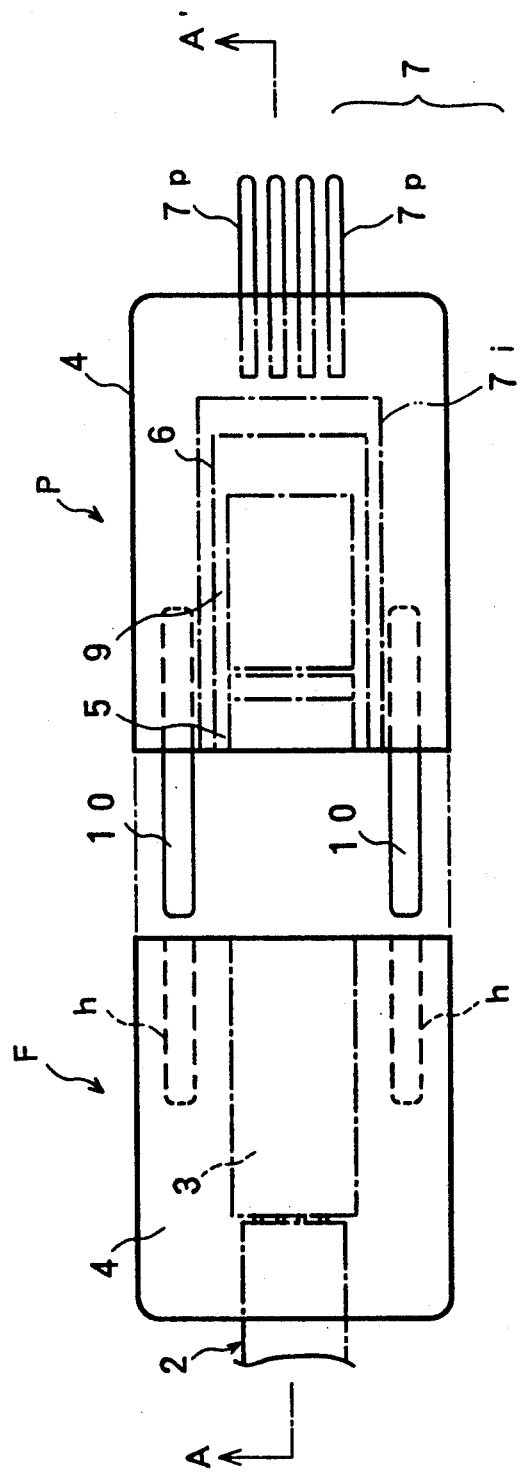
FIG. 1A is a plan view showing the structure of a light-receiving apparatus using a multi-core optical fiber and a light-receiving element array according to the first embodiment of the present invention.
Figure 1B:
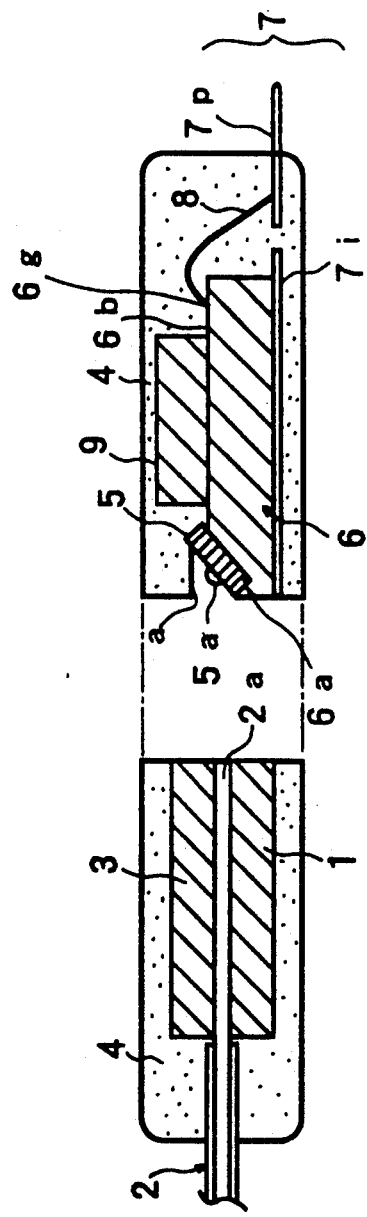
FIG. 1B is a longitudinal sectional view of the light-receiving apparatus of FIG. 1A taken along the line A—A' thereof.
Figure 2:
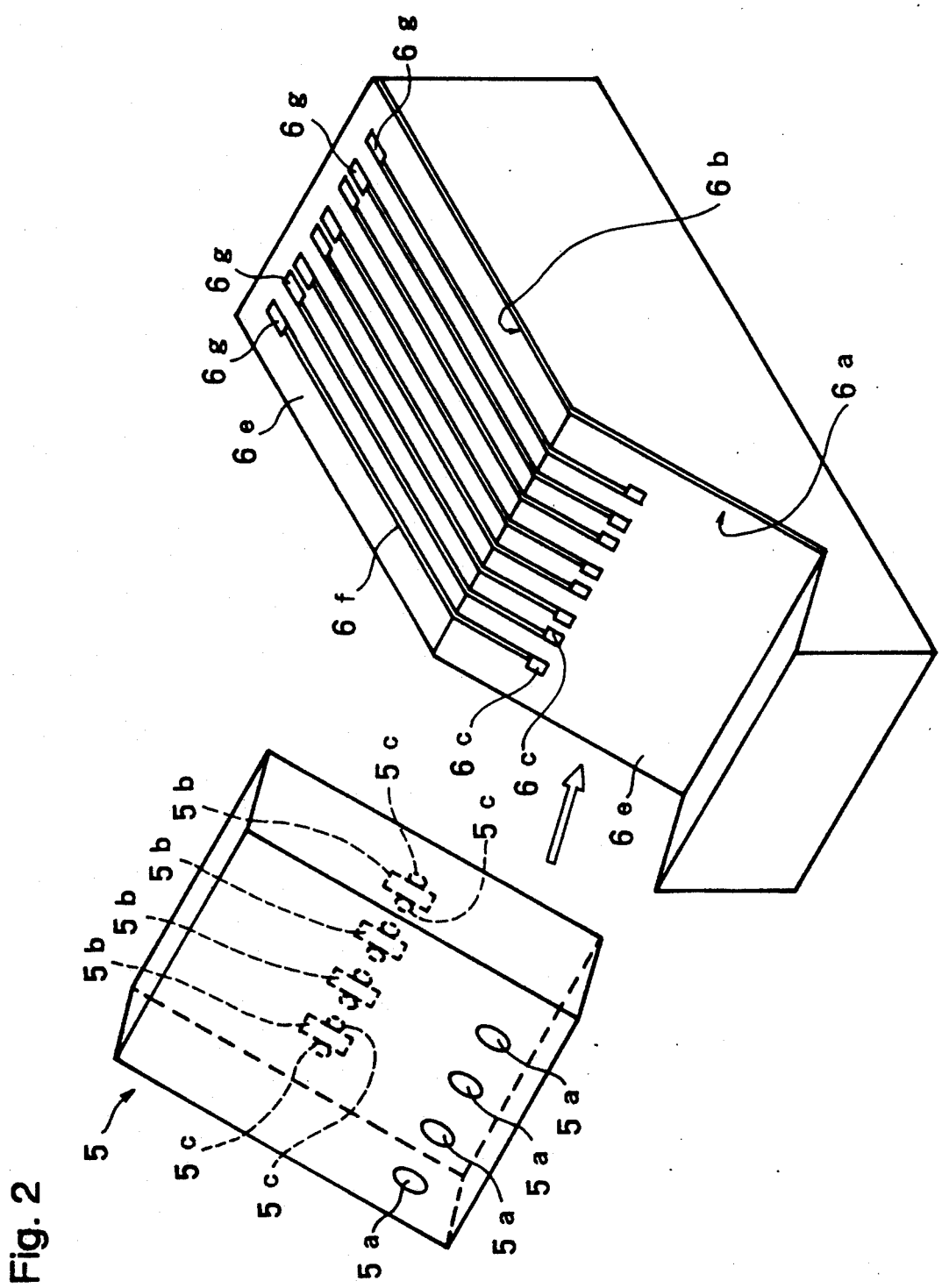
FIG. 2 is an exploded perspective view of first and second substrates of the light-receiving apparatus according to the first embodiment of the present invention before packaging with a resin material.
Figure 4A:
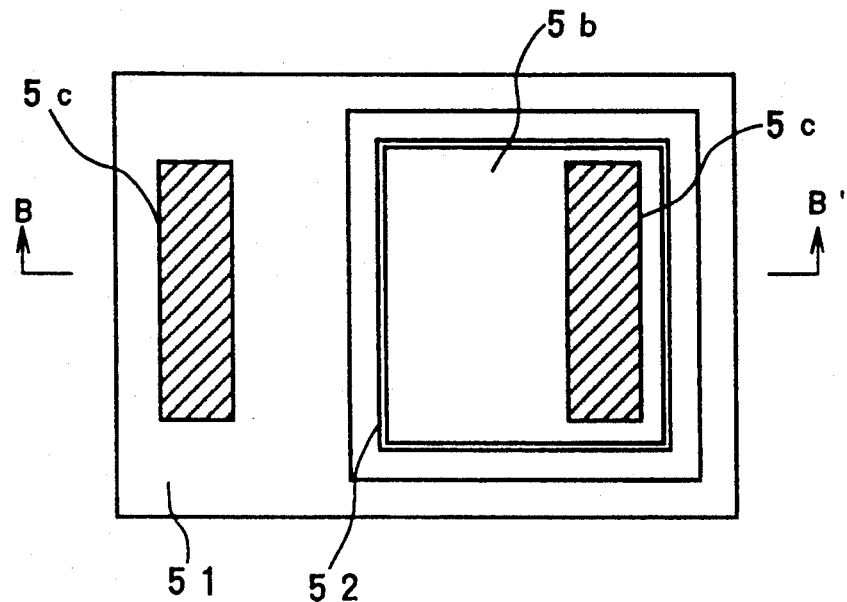
FIG. 4A is an enlarged plan view of the structure of the electrode of the first substrate which can be used in the light-receiving apparatus of the first embodiment of the present invention.
Figure 4B:
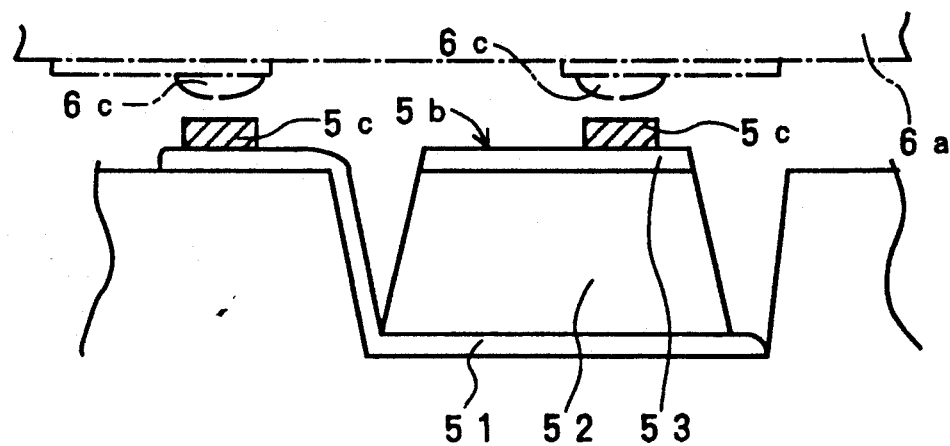
FIG. 4B is a longitudinal sectional view of the electrode of FIG. 4A taken along the line B—B' thereof.

The light receiving apparatus according to the invention is constituted by first and second package bodies F and P. When a pair of guide pins extending from a side surface of the second package body P are fitted in a pair of guide holes h formed in a side surface of the first package body F, the first and second package bodies F and P are coupled.

A light-receiving apparatus according to the first embodiment of the present invention will be described with reference to FIGS. 1, 2, 3, and 4.

The interior of the first package body F has a structure of a so-called multi-core connector, and a multi-core optical fiber cable conductor 2, e.g., a tape-shaped optical fiber cable conductor, is clamped between aligning substrate 1 and fixing substrate 3.

The aligning substrate 1 is constituted by a semiconductor chip made of, e.g., Si, and a multiple of V grooves(V-shaped grooves) are formed in the same direction in a row on an upper surface of the aligning substrate 1 opposing the fixing substrate 3. The cladding on the distal end portion of the multi-core optical fiber cable 2 is removed to expose a plurality of optical fibers 2a. These optical fibers 2a are aligned in the V grooves at the equal pitch. The fixing substrate 3 is constituted by a flat plate made of, e.g., Si to fix the plurality of optical fibers 2a in the V grooves. As a result, all the optical fibers extending from the multi-core optical fiber cable 2 are positioned on the aligning substrate 1 with good precision. In the state that the exit end faces of the plurality of optical fibers 2a are exposed in a row, and the aligning substrate 1, the multi-core optical fiber cable conductor 2, and the fixing substrate 3 are integrally held by a resin member 4. The pair of guide holes h are formed in the exit surface of the first package body F where the exit end faces of the optical fibers 2a are exposed along the optical axis such that they sandwich the exit end faces of the optical fibers 2a from two sides. The first package body F is formed by, e.g., mounting the aligning substrate 1 and the fixing substrate 3 in molds and injecting a resin material in the molds to perform resin molding.

The second package body P includes a first substrate 5, a second substrate 6, lead pins (external leads) 7, wires 8, a third substrate 9, and guide pins 10 and a resin member 4. The first substrate 5 is held in a V groove formed on the one end of the second substrate 6, and the third substrate 9 is placed on a flat portion 6b of the second substrate 6. The second substrate 6 is placed on island portions 7i, and the island portions 7i are connected to lead pins 7p. The island portions 7i and the lead pins 7p constitute the same lead frame. The lead frame comprises a frame portion, the island portion 7i, and the lead pin 7p, and is mounted on a mold for transfer molding. Then, a resin material is injected in the mold to form a package body, and the first, second, and third substrates 5, 6, and 9, the island portions 7i, and the lead pins 7p are integrally held by the resin material. One end portion of each lead pin 7p is arranged on the side of the other end portion of the second substrate 6, and the other end portion of the lead pin 7p extends to the outside of the second package body P.

In this embodiment, an opening a is formed in the vicinity of the lens portion 5a of the resin member 4. However, when the resin member 4 is made of a material which transmits light from the optical fiber 2a, the opening a is not needed.

The detail structures of the respective components constituting the second package body P described above will be described. The plurality of lens portions 5a are linearly formed on the surface of the first substrate 5. Light-receiving portions 5b corresponding in number to the lens portions 5a are linearly arranged on a region, which the optical axes of the emitted light rays incident on the lens portions 5a intersect to, on a lower surface of the first substrate 5. A pair of signal extraction electrodes (first electrodes) 5c are formed on the two sides of each light-receiving portion 5b. A semiconductor chip formed by, e.g., undoped InP can be used as the material of the first substrate 5, and a structure in which NiB is plated with gold can be employed for each electrode. Note that the pair of electrodes 5c are formed to have the same height as that of the surface of the first substrate 5. These electrodes 5c can be formed by a known technique. For example, a groove having an inverted trapezoidal section may be formed in the undoped first substrate 5, and n+-, i-, and p$^{30}$-type layers 51, 52, and 53 may be sequentially formed in this groove by selective deposition, thereby forming each electrode 5c (see FIGS. 4A and 4B). To form the light-receiving portions 5b, a method of implanting ions in the first substrate 5 to form a p-n junction inside the lower surface of the first substrate 5, or a method of forming a photoconductor type structure including InGaAs and AlInAs layers on a lower surface of the first substrate 5 by epitaxy can be employed. The second substrate 6 includes an inclined portion 6a and a flat portion 6b. The inclined portion 6a constitutes one inclined surface of the V groove, and a plurality of electrodes (second electrodes) 6c are formed on the inclined portion 6a at the same pitch to correspond to the signal extraction electrodes 5c described above. Thus, when the lower surface of the first substrate 5 is placed on an inclined portion 6a of the V groove to bring the lower portion of the first substrate 5 into contact with the other inclined portion of the V groove, alignment of electrodes 5c and 6c in the vertical direction is completed. In this embodiment, since the widths of the first and second substrates 5 and 6 are the same, horizontal alignment of the first and second substrates 5 and 6 can be easily performed by causing their side surfaces to coincide with each other.

The V groove can be easily formed by grinding using a diamond blade (included angle: 60° to 120°).

A wiring portions 6f formed on the insulating film 6e and connected to the electrodes 6c, and electrodes (third electrodes) 6g connected to the end portions of the wiring portions 6f and connected to the lead pins 7 extending to the outside through the wires 8 are formed on the flat portion 6b(FIG. 3). The inclined portion 6a is necessarily made by forming a V groove in an end portion of the second substrate 6 by, e.g., dicing. When the depth of the V groove is changed, a mounting portion for the first substrate 5 is changed so that the inclined portion 6a can easily cope with a first package body F having optical fibers 2a having different heights(Refer to FIG. 1B). The wiring portions 6f can be formed by a known technique e.g., sputtering, plating, vapor deposition, or the like.

To place the first substrate 5 on the V groove, a solder may be coated on the electrodes 6c in advance, the first and second substrates 5 and 6 may be mated, and the second substrate 6 may be heated, thereby connecting the electrodes 5c and 6c.

According to this embodiment, when the guide pins 10 are inserted in the guide holes h, the optical fibers 2a and the light-receiving portions 5b are optically coupled. Thus, alignment of the components is very easy.

When the second package body P is to be formed, it is aligned with the optical fibers in the vertical direction only by holding the first substrate 5 in the V groove of the second substrate 6, and alignment in the horizontal direction is realized by moving the first substrate 5 along the V groove. Hence, alignment before packaging is easy, and the mounting structure of the package is stable. Accordingly, even when a package body is to be molded by mounting this mounting structure in molds and injecting a resin material, misalignment caused by the injecting pressure of the resin material can be prevented.

When ball lenses to be easily fixed by using adhesive are used as the lens portions 5a of the first substrate 5 so that the positions of the lens portions 5a can be changed, alignment of the second package body P with the optical fibers in the vertical direction can be performed.

A flow of a signal in the light-receiving apparatus of this embodiment will be described. Transmission light emerging from each optical fiber 2a is received by the corresponding lens portion 5a of the first substrate 5, condensed inside the first substrate 5, and incident on the corresponding light-receiving portion 5b. The incident light is converted to an electric signal by the light-receiving portion 5b and supplied to the corresponding signal extraction electrodes 5c. Since the signal extraction electrodes 5c are connected to the electrodes 6c formed on the inclined portion 6a of the second substrate 6, the electrical signal extracted by the signal extraction electrodes 5c is sent to the corresponding lead pin 7, having one end extending to the outside, through the electrodes 6c, the receiving circuit 6d, and the electrodes 6g.

Figure 5:
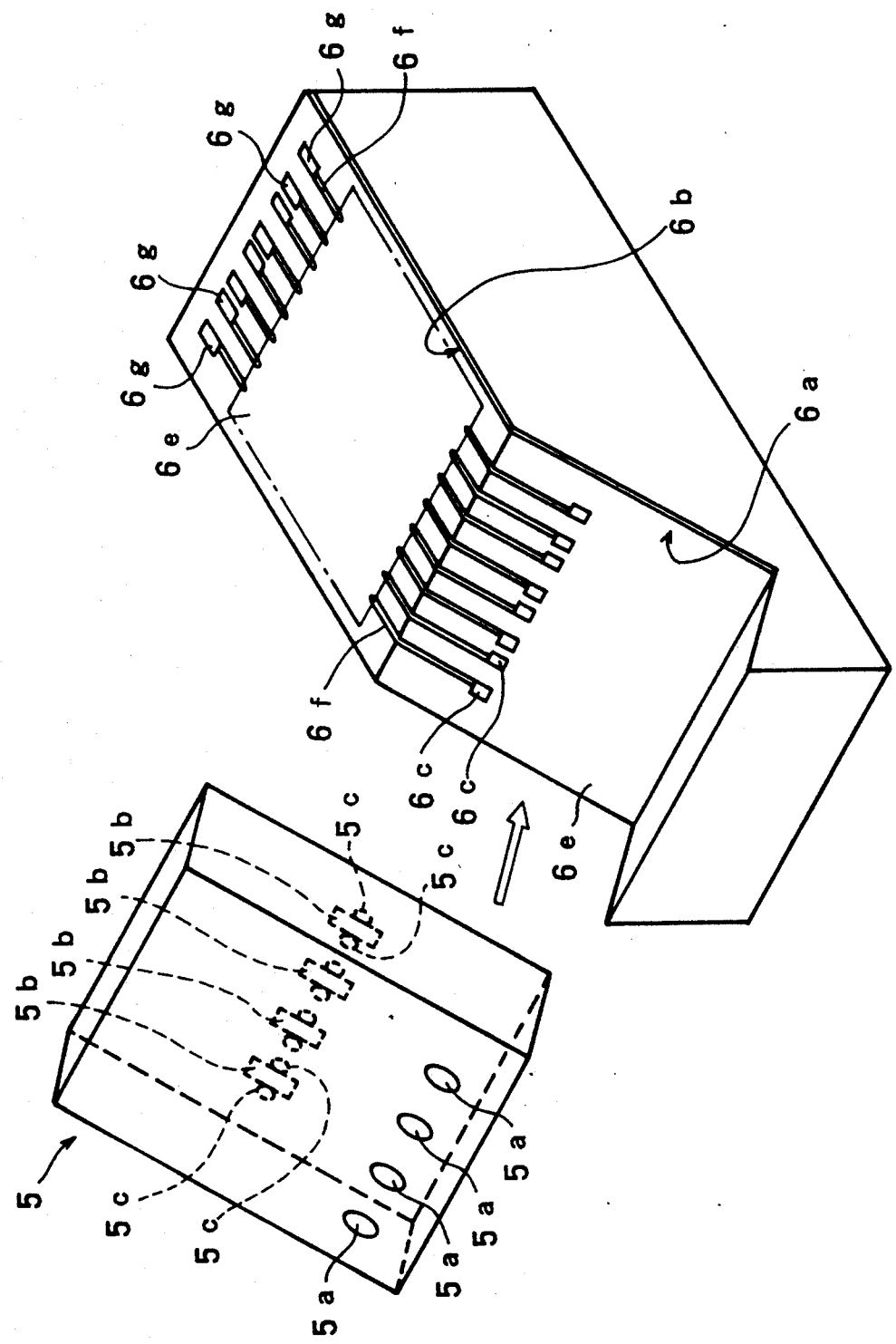
FIG. 5 is an exploded perspective view of first and second substrates of a light-receiving apparatus according to the second embodiment of the present invention before packaging with a resin material.

A light-receiving apparatus according to the second embodiment of the present invention will be described with reference to FIGS. 5, 6, and 7. The second embodiment is different from the first embodiment in that a receiving circuit 6d is formed on a flat portion 6b of a second substrate 6.

Figure 7:
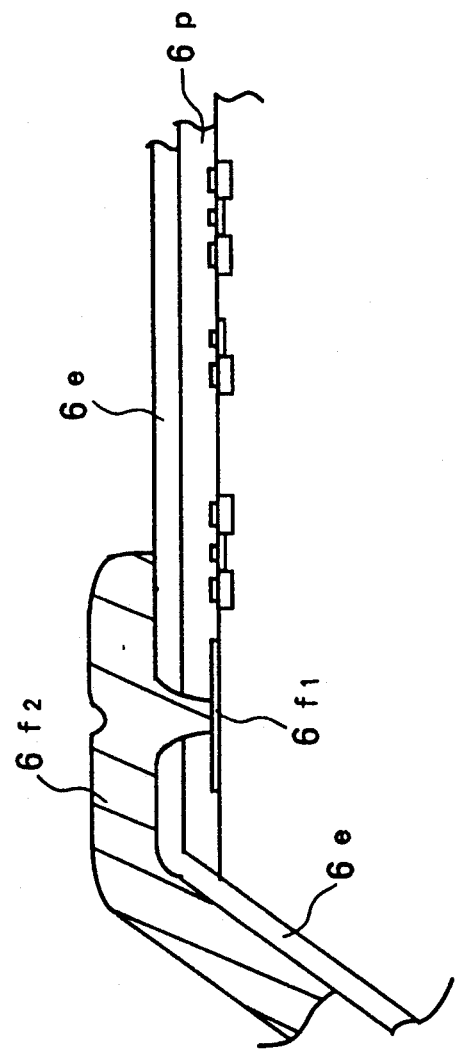
FIG. 7 is an enlarged longitudinal sectional view of the flat portion of the second substrate of the light-receiving apparatus according to the second embodiment of the present invention.

A reception circuit 6d having a semiconductor circuit, e.g., an FET or a diode, and an electrode 6f1 is formed on the flat portion 6b, and the surface of the receiving circuit 6d is covered with a passivation film 6p (see FIG. 7). Thus, the semiconductor circuit is protected against the outside. The passivation film 6p is covered with an insulating film 6e extending to an inclined portion of the V groove. An opening is formed to extend through the passivation film 6p and the insulating film 6e on each electrode 6f1, and the electrode 6f1 formed on the inclined portion 6a and the electrode 6f2 are connected to each other through the opening.

Figure 6:
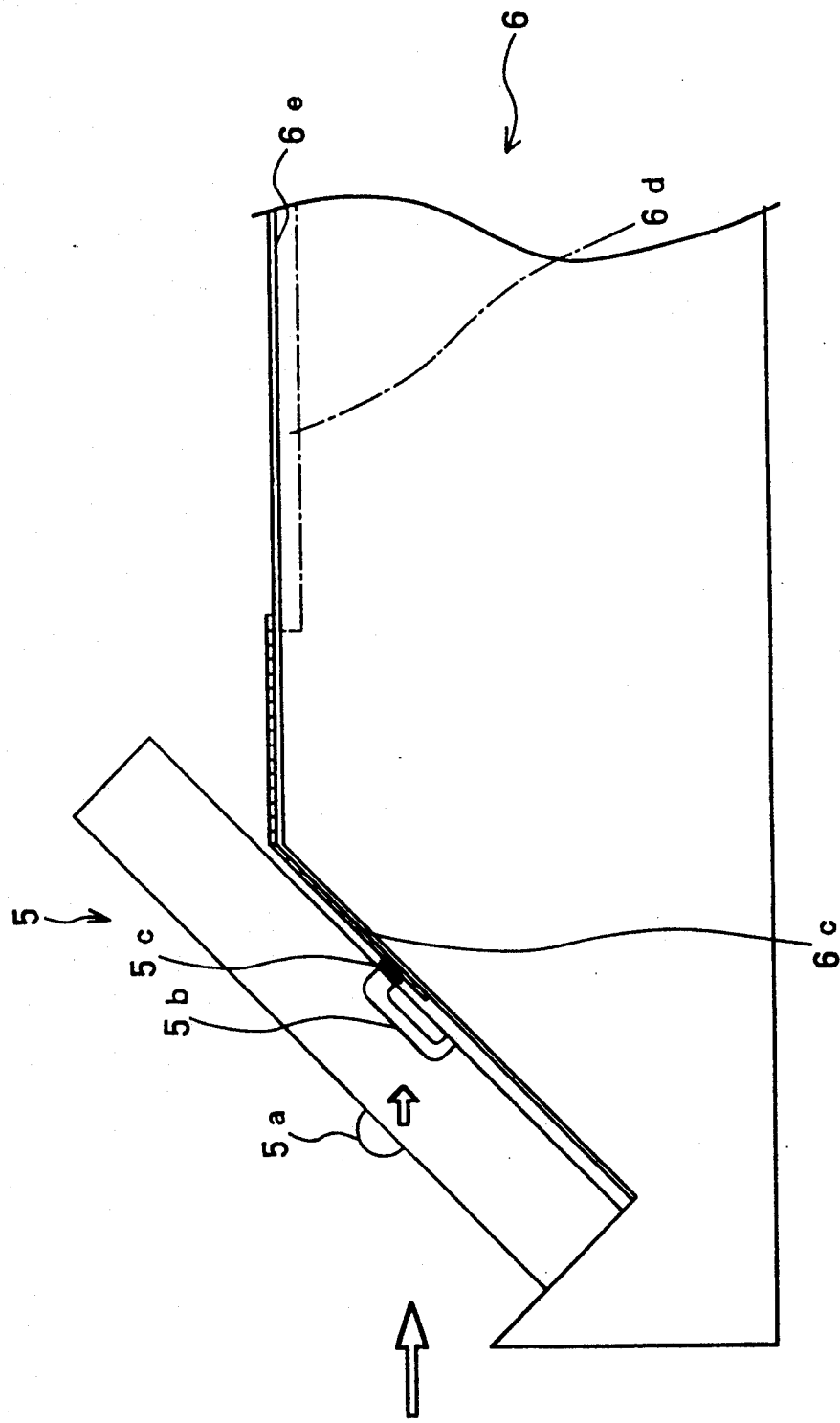
FIG. 6 is an enlarged longitudinal sectional view of the light-receiving apparatus according to the second embodiment of the present invention in a state before packaging wherein the first substrate is held on the inclined surface of the second substrate.

In FIG. 6, the gap between the first and second substrates 5 and 6 is indicated to be large. In fact, however, since the thickness of the first substrate 5 is 100 μm and its length is 100 to 500 μm while the thickness of the electrode 5c is 5,000 Å, almost no backlash occurs between the first and second substrates 5 and 6.

Figure 8:
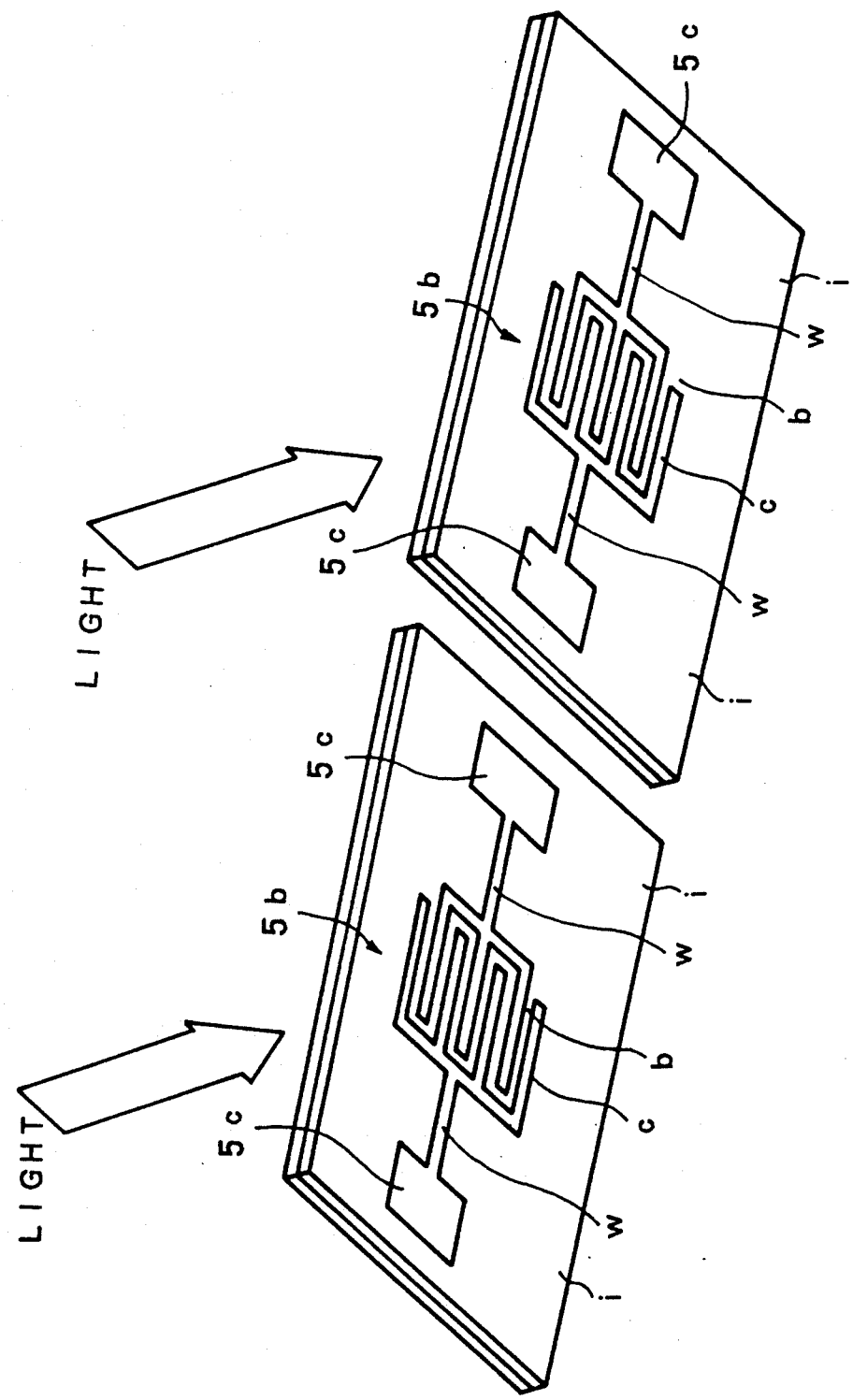
FIG. 8 is a perspective view of a structure of a light-receiving portion employing an MSM structure applicable to the present invention, in which the longitudinal direction of comb-shaped electrodes coincide with a direction along which signal extraction electrodes are aligned.
Figure 9:
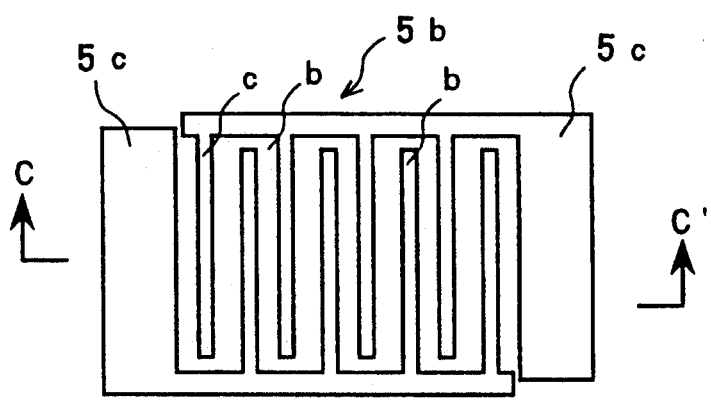
FIG. 9A is a plan view of a structure of a light-receiving portion employing the MSM structure applicable to the present invention, in which the longitudinal direction of the comb-shaped electrodes is perpendicular to a direction along which signal extraction electrodes are aligned.
FIG. 9B is a longitudinal sectional view of the electrode of FIG. 9A taken along the line C—C' thereof.
Figure 9:
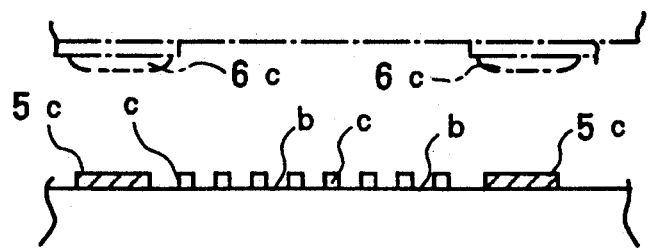

A light-receiving portion which employs the MSM structure and which can be used in the light-receiving apparatus according to the present invention will be described with reference to FIGS. 8 and 9. FIG. 8 shows a structure in which the direction along which a pair of electrodes 5c are aligned and the longitudinal direction of a comb-shaped electrode c are set to coincide with each other, and FIG. 9 shows a structure in which the longitudinal direction of comb-shaped electrodes c is set to be perpendicular to the direction along which a pair of electrodes 5c are aligned.

Each light-receiving portion 5b has the pair of comb-shaped electrodes c interdigitated to fit in the light-receiving region b. The respective electrodes c are connected to the signal extraction electrodes 5c arranged on the both sides of the light-receiving region b. Since the light-receiving region b is, e.g., a photodiode having an MSM structure constituted by a conductive layer (e.g., an InGaAs layer) and a cap layer (e.g., an AlInAs layer), the light-receiving region is comparatively large, and the volume is small. Thus, the light-receiving portion 5b capable of effectively absorbing light and suitable for a high-speed operation is formed.

Since the signal extraction electrodes 5c and their wiring portions w are formed on an insulating film i, e.g., a nitride film, a dark current can be prevented. As the photodiode having the MSM structure, a semiconductor light-receiving element shown in an article entitled "Very high speed GaInAs metal-semiconductor-metal photodiode incorporating an AlInAs/GaInAs graded superlattice" (Appl. Phys. Lett. 54(1), Jan. 2, 1989, pp. 16-17) or Japanese Patent Application No. 2-280633 can be used, or a known photoconductive cell (PCD) can be used in place of the photodiode having the MSM structure.

When a photoconductive cell or a photodiode having an MSM structure is used as each light-receiving portion of the light-receiving apparatus according to the present invention, the light-receiving region is increased and the volume can be decreased, so that light can be absorbed efficiently and the high-speed characteristics are improved.

Figure 10:
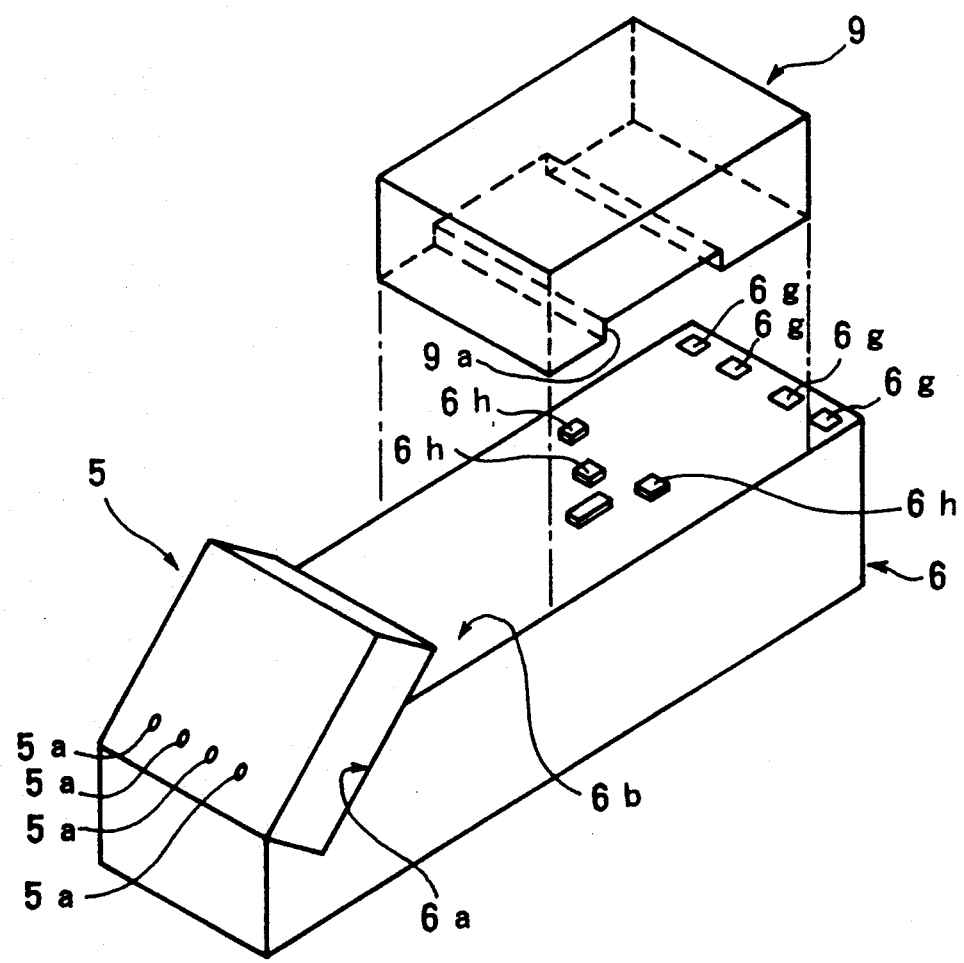
FIG. 10 is an exploded perspective view of a second substrate combined with a first substrate and a third substrate of a light-receiving apparatus according to the third embodiment of the present invention in a state before packaging with a resin material.

A light-receiving apparatus according to the third embodiment of the present invention will be described with reference to FIG. 10. The third embodiment is different from the embodiment described above in that a receiving circuit is formed on a flat portion 6b of a second substrate 6, and an electronic circuit component 6h, e.g., a resistor or a capacitor, is mounted on the flat portion 6b through an insulating film.

A recessed portion is formed in the central portion of the bottom surface of a third substrate 9 so as not to press the electronic circuit component 6h mounted on the flat portion 6b of the second substrate 6.

Figure 11A:
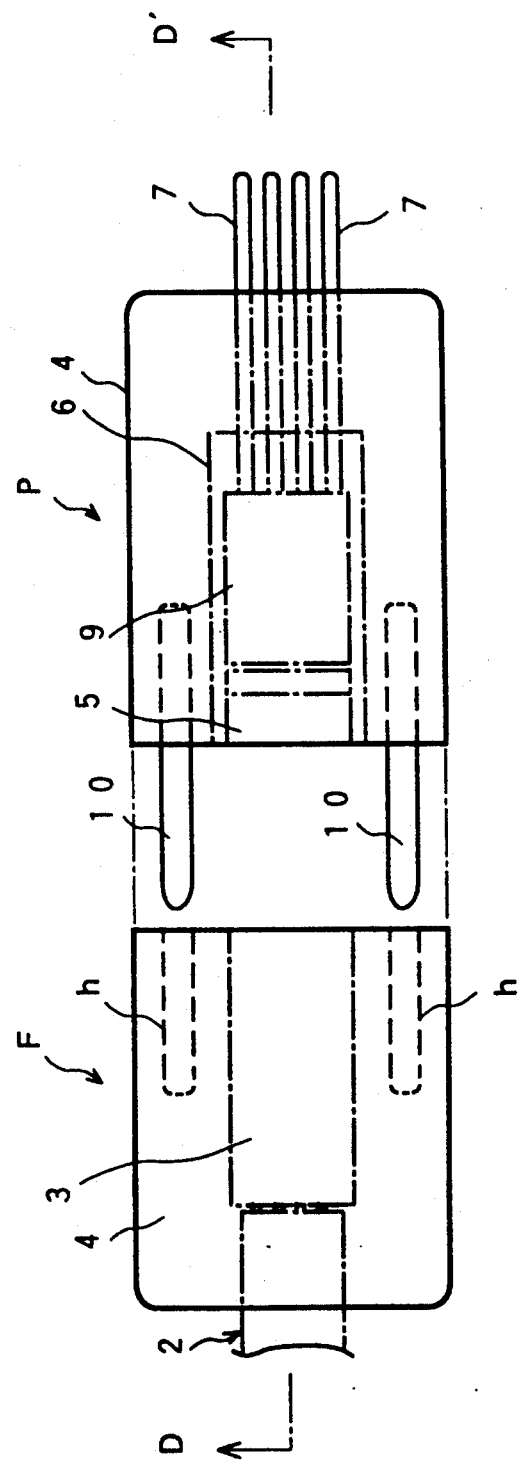
FIG. 11A is a plan view of a structure of a light-receiving apparatus according to the fourth embodiment of the present invention which uses a multi-core optical fiber and a light-receiving element array.
Figure 11B:
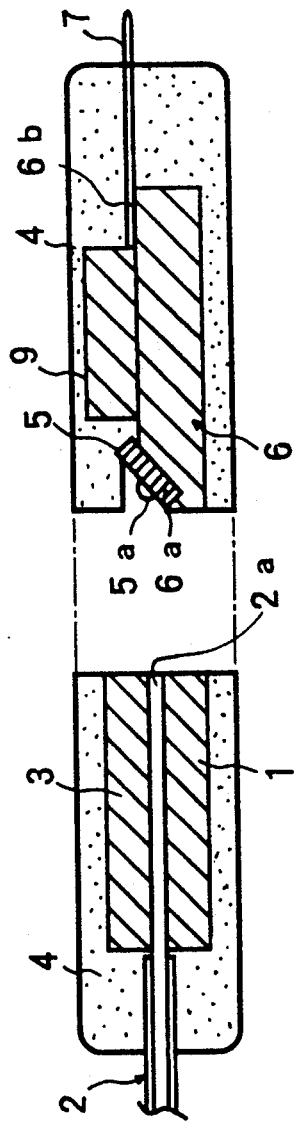
FIG. 11B is a longitudinal sectional view of the light-receiving apparatus of FIG. 11A taken along the line D—D' thereof.

A light-receiving apparatus according to the fourth embodiment of the present invention will be described with reference to FIGS. 11, 12, and 13. The fourth embodiment is different from the embodiment described above in that lead pins 7 extending to the outside and electrodes 6g are directly connected to each other without using wires (see FIGS. 11A and 11B). For this purpose, grooves for holding the lead pins 7 are formed on the bottom surface of a third substrate 9 (see FIG. 12).

Figure 12:
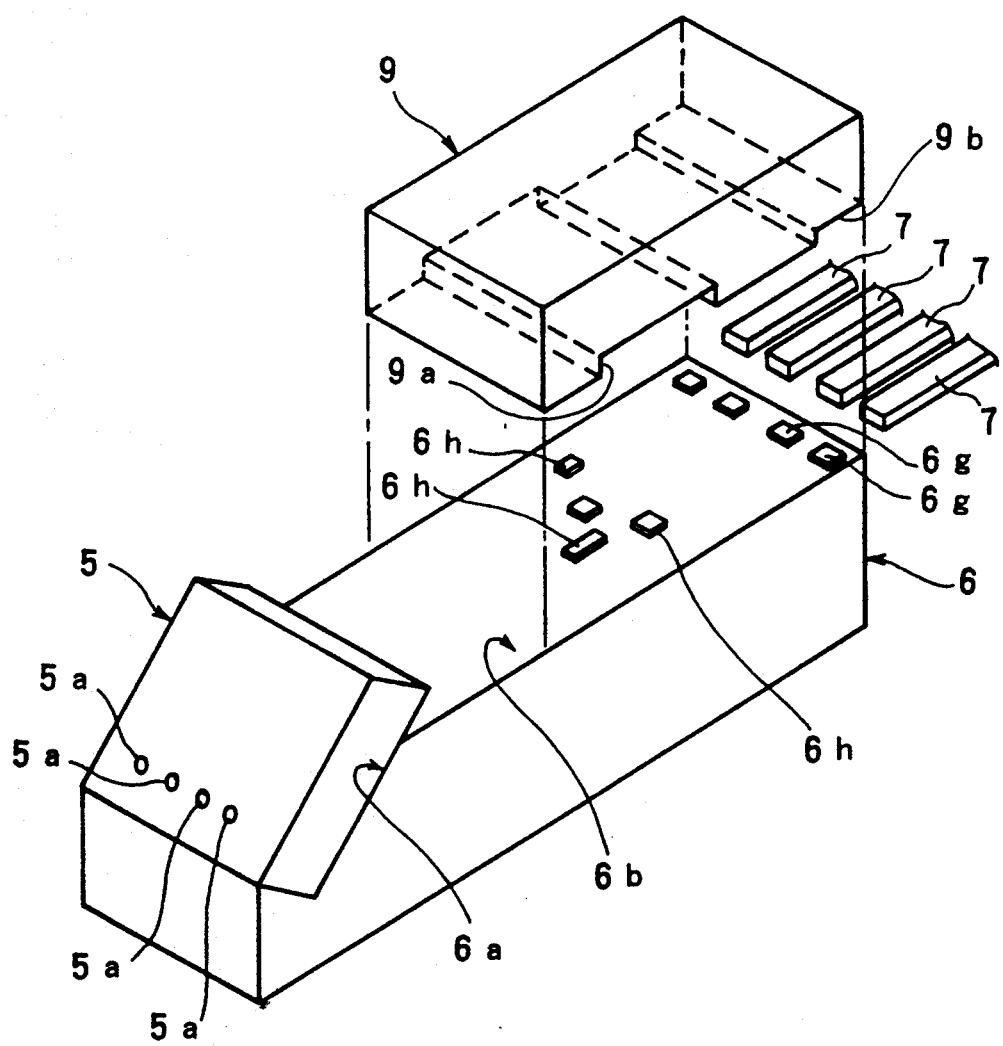
FIG. 12 is an exploded perspective view of a second substrate combined with a first substrate, a third substrate, and lead pins of the light-receiving apparatus according to the fourth embodiment of the present invention before packaging with a resin material.
Figure 13A:
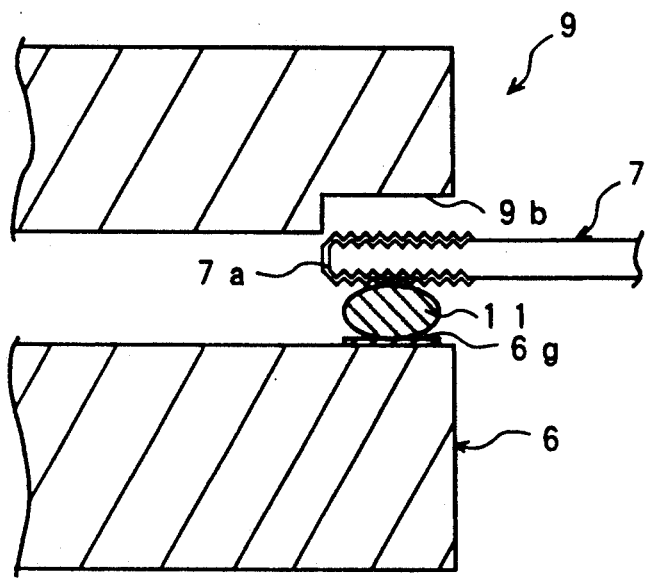
FIGS. 13A and 13B are enlarged longitudinal sectional views of a groove portion of the third substrate clamping the distal end portions of the lead pins of the light-receiving apparatus according to the fourth embodiment of the present invention.
Figure 13B:
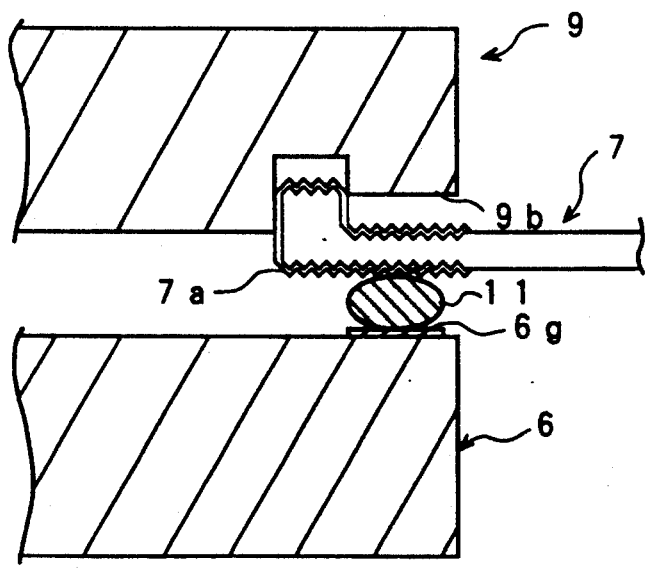

FIGS. 12 and 13A show a structure in which a rectangular region located at an end portion of a third substrate 9 is removed to provide an I-shaped groove. Gold plating layers 7a are formed on the distal end portions of lead pins 7, and the surfaces of the gold plating layers 7a are coarse as if they are surface-processed by filing. The lead pins 7 are bonded on third electrodes 6g by the third substrate 9 through bumps 11. Since a multiple of recesses and projections are formed on the distal end portions of the lead pins 7, this bonding is facilitated. An L-shaped groove having portions of different depths is formed in a third substrate 9 shown in FIG. 13B, and lead pins 7 having L-shaped distal ends are engaged in the L-shaped groove. In this case, engaging portions are formed in the groove portion 9a, and the distal end portions of the lead pins 7 are engaged with these portions. Therefore, the mounted state of the lead pins 7 are further stabilized.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

I claim:

1. A light-receiving apparatus comprising:

a first package body for positioning an optical fiber and integrally holding said optical fiber while an exit end face of said optical fiber is exposed to an outside, and a second package body, including a first substrate having a lower surface on which a light-receiving portion for receiving transmission light from said optical fiber and outputting an electrical signal and first electrodes, connected to said light-receiving portion, for extracting the electrical signal are formed, and a second substrate, having second electrodes connected to said first electrodes and third electrodes connected to external leads, said second electrodes being formed on an inclined surface of a V-shaped groove of said second substrate, and said third electrodes being formed on said second substrate, for integrally holding said first and second substrates while said first substrate is held in the V-shaped groove of said second substrate and said first and second electrodes are connected to each other.

2. A light-receiving apparatus according to claim 1, characterized in that said first substrate is constituted by a rectangular semiconductor chip, and the V-shaped groove has a vertical angle of almost 90°.

3. A light-receiving apparatus according to claim 1, wherein a pair of guide grooves are formed in said first package body and a pair of guide pins to be inserted in the guide grooves project from corresponding positions of said second package body.

4. A light-receiving apparatus according to claim 1, characterized in that said first package body holds a plurality of optical fibers substantially linearly, and said second package body comprises light-receiving portions corresponding in number to said plurality of optical fibers.

5. A light-receiving apparatus according to claim 4, wherein said plurality of optical fibers extend from a tape-shaped optical fiber cable conductor.

6. A light-receiving apparatus according to claim 1, wherein said first package body includes two substrates, and said optical fiber is positioned in said first package body by said two substrates.

7. A light-receiving apparatus according to claim 1, characterized in that the V-shaped groove of said second substrate is formed by grinding with a dicing blade.

8. A light-receiving apparatus according to claim 2, wherein said semiconductor chip is made of a material that transmits light transmitted through said optical fiber, and a lens portion is formed on a surface of said semiconductor chip.

9. A light-receiving apparatus comprising a first package body, having a pair of substrates for clamping an optical fiber that transmits an optical signal, for integrally holding said pair of substrates and said optical fiber with a resin material while an exit end face of said optical fiber is exposed to an outside, and a second package body for integrally holding first and second substrates with a resin material, said first substrate being made of said material that transmits an optical signal and having an upper surface on which a lens portion for receiving the optical signal from said optical fiber is formed, and a lower surface on which a light-receiving portion for converting the optical signal to an electric signal and first electrodes connected to said light-receiving portion are formed, and said second substrate placing said first substrate thereon and having an upper surface on which a V-shaped groove and a flat portion are formed, the V-shaped groove having second electrodes connected to said first electrodes, and said flat portion being formed in the vicinity of the V-shaped groove and having third electrodes connected to said second electrodes.

10. A light-receiving apparatus according to claim 9, characterized in that a receiving circuit connected to said second and third electrodes is formed in said flat portion.

11. A light-receiving apparatus according to claim 1, characterized in that said second substrate is mounted on an island portion of a lead frame and said external leads constitute a part of said external leads.

12. A light-receiving apparatus according to claim 1 wherein said light receiving portion has comb-shaped electrodes and said first electrodes are connected to said comb-shaped electrodes.

13. A light-receiving apparatus according to claim 1, characterized in that said light-receiving portion is a photoconductive cell.

14. A light-receiving apparatus according to claim 1, characterized in that said light-receiving portion is a photodiode having an metal-semiconductor-metal structure.

15. A light-receiving apparatus according to claim 1, wherein said second substrate has a flat portion, said flat portion having said third electrodes formed thereon, and further comprising a third substrate for clamping end portions of said external leads on said third electrodes of said second substrate.

16. A light-receiving apparatus according to claim 15, wherein an electronic circuit component is mounted on said flat portion and a groove for storing said electronic circuit component is formed in a lower surface of said third substrate.

17. A light-receiving apparatus according to claim 15, characterized in that a groove is formed in an end portion of said third substrate to hold said end portions of said external leads therein.

18. A light-receiving apparatus according to claim 17, characterized in that said end portions of said external leads are plated with a metal.

* * * * *